United States Patent
Eberhard et al.

(10) Patent No.: US 7,622,897 B2
(45) Date of Patent: Nov. 24, 2009

(54) MULTI-MODE CHARGING SYSTEM FOR AN ELECTRIC VEHICLE

(75) Inventors: Martin Forest Eberhard, Woodside, CA (US); Jeffrey Brian Straubel, Menlo Park, CA (US); Kurt Russell Kelty, Palo Alto, CA (US); Scott Ira Kohn, Redwood City, CA (US); Weston Arthur Hermann, Palo Alto, CA (US); Eugene Michael Berdichevsky, Redwood City, CA (US); Andrew Gregory Simpson, Chapel Hill (AU); Craig Bruce Carlson, Los Altos, CA (US)

(73) Assignee: Tesla Motors, Inc., San Carlos, CA (US)

( * ) Notice: Subject to any disclaimer, the term of this patent is extended or adjusted under 35 U.S.C. 154(b) by 0 days.

(21) Appl. No.: 12/322,221

(22) Filed: Jan. 29, 2009

(65) Prior Publication Data
US 2009/0167254 A1 Jul. 2, 2009

Related U.S. Application Data

(63) Continuation of application No. 12/321,279, filed on Jan. 16, 2009, which is a continuation-in-part of application No. 11/818,838, filed on Jun. 15, 2007, which is a continuation-in-part of application No. 11/779,678, filed on Jul. 18, 2007, which is a continuation-in-part of application No. 12/058,047, filed on Mar. 28, 2008.

(51) Int. Cl.
*H02J 7/04* (2006.01)
*H02J 7/16* (2006.01)
(52) U.S. Cl. .......... 320/150; 320/104; 320/152
(58) Field of Classification Search .......... 320/150, 320/104, 151–152
See application file for complete search history.

(56) References Cited

U.S. PATENT DOCUMENTS

| | | | | |
|---|---|---|---|---|
| 4,308,493 A * | 12/1981 | Kothe et al. | .......... | 320/152 |
| 5,872,453 A * | 2/1999 | Shimoyama et al. | .......... | 324/431 |
| 5,939,864 A * | 8/1999 | Lenhart et al. | .......... | 320/137 |
| 6,011,380 A * | 1/2000 | Paryani et al. | .......... | 320/132 |
| 6,215,281 B1 * | 4/2001 | Koch | .......... | 320/150 |
| 6,904,342 B2 * | 6/2005 | Hanada et al. | .......... | 701/22 |
| 2003/0087148 A1 * | 5/2003 | Minamiura | .......... | 429/62 |

* cited by examiner

*Primary Examiner*—Edward Tso
*Assistant Examiner*—Samuel Berhanu
(74) *Attorney, Agent, or Firm*—Patent Law Office of David G. Beck

(57) ABSTRACT

A method and apparatus that allows the end user to optimize the performance of an all-electric or hybrid vehicle and its charging system for a desired mode of operation is provided. The system of the invention includes multiple charging/operational modes from which the user may select. Each charging/operational mode controls the cut-off voltage used during charging and the maintenance temperature of the battery pack.

29 Claims, 4 Drawing Sheets

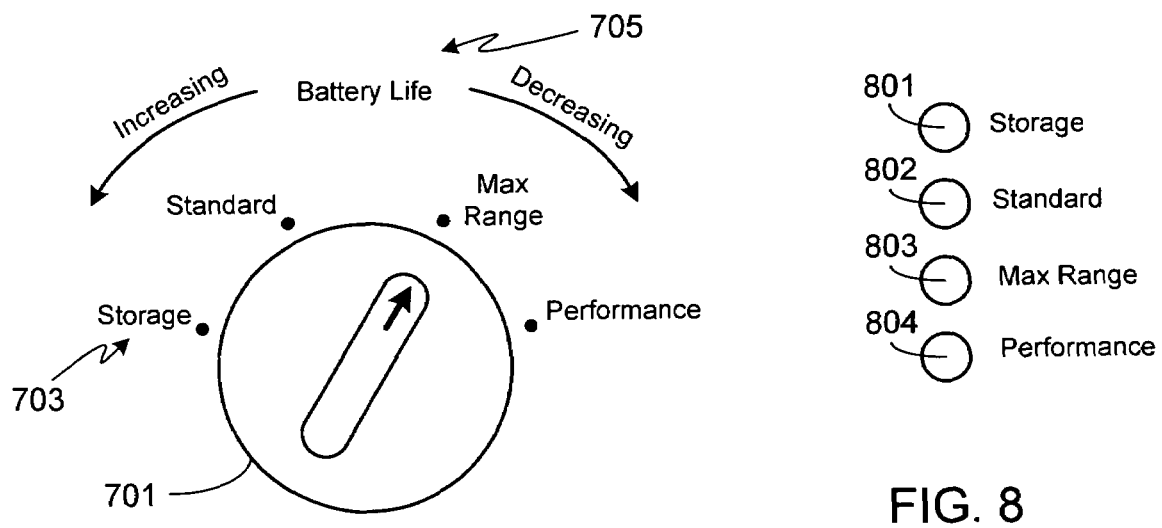
FIG. 7
801 ◯ Storage
802 ◯ Standard
803 ◯ Max Range
804 ◯ Performance
FIG. 8
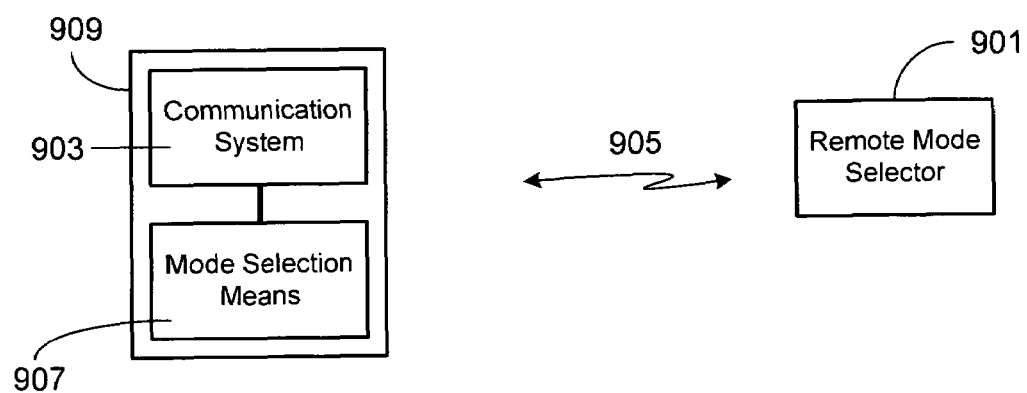
FIG. 9

MULTI-MODE CHARGING SYSTEM FOR AN ELECTRIC VEHICLE

CROSS-REFERENCE TO RELATED APPLICATION

This application is a continuation of U.S. patent application Ser. No. 12/321,279, filed Jan. 16, 2009, which is a continuation-in-part of U.S. patent application Ser. No. 11/818,838, filed Jun. 15, 2007; Ser. No. 11/779,678, filed Jul. 18, 2007; and Ser. No. 12/058,047, filed Mar. 28, 2008; the disclosures of which are incorporated herein by reference for any and all purposes.

FIELD OF THE INVENTION

The present invention relates generally to batteries and, more particularly, to a method and apparatus for providing different charging and cooling modes for the battery pack of an electric vehicle.

BACKGROUND OF THE INVENTION

Batteries have been used for decades to supply power to a variety of different electrical and electromechanical devices. Early batteries, referred to as disposable batteries, were simply used until depleted and then discarded and replaced with one or more new batteries. A newer type of battery, referred to as a rechargeable battery, is capable of being recharged and then reused, therefore offering economic, environmental and ease-of-use benefits compared to a disposable battery.

Although rechargeable batteries provide a much longer service life than disposable batteries, their service life is not unlimited. Depending upon the type of battery, a rechargeable battery can typically be recharged anywhere from 100 times (e.g., alkaline) to 1000 times (e.g., lithium-ion, lithium-polymer) to 20,000 times or more (e.g., thin film lithium). In addition to depending upon the type of battery chemistry involved, the number of cycles that a rechargeable battery can be recharged depends on a variety of other factors that include; (i) the rate of charging (i.e., slow trickle charge versus fast charge), (ii) the level of charging (i.e., 75% of full charge, full charge, over-charged, etc.), (iii) the level of discharge prior to charging (i.e., completely depleted, still charged to a low level, etc.), (iv) the storage temperature of the battery during non-use, and (v) the temperature of the battery during use.

Due to the high initial cost of rechargeable batteries, expensive products such as laptop computers often incorporate relatively sophisticated power management systems, thereby extending battery life and allowing the use of smaller, lower capacity batteries and/or batteries that utilize less expensive cell chemistries. One of the most common power management techniques is to place certain laptop components and peripherals, especially those that require relatively high levels of power to function, into either a standby mode or a low power usage mode whenever possible. Thus, for example, a laptop may provide two different video screen brightness levels; high brightness when the computer is plugged in, and low brightness when the computer is operating on battery power. This is also the primary purpose behind powering down the video screen when the computer is inactive for more than a short period of time or placing wireless connectivity capabilities (e.g., Bluetooth, WiFi, WAN, etc.) or other non-essential peripherals in standby mode when they are not required.

A growing application for rechargeable batteries is that of electric vehicles. All-electric and hybrid vehicles, however, present a number of engineering challenges, primarily due to the need for the rechargeable battery pack of such a vehicle to meet the consumers' expectations relative to performance, range, reliability, lifetime and cost. The present invention provides a battery pack recharging system and user interface that helps achieve these goals.

SUMMARY OF THE INVENTION

The present invention provides a method and apparatus that allows the end user to optimize the performance of an all-electric or hybrid vehicle and its charging system for a desired mode of operation.

In at least one embodiment of the invention, the electric vehicle includes a multi-mode charging and operating system comprised of a battery charging system that utilizes a cut-off voltage selected from at least three cut-off voltages; a battery cooling system with a first mode of operation when the battery charging system is not coupled to an external charging power source and a second mode of operation when the battery charging system is coupled to an external charging power source, wherein the battery cooling system cools the electric vehicle's battery pack to a temperature within a first temperature range or a second temperature range when in the first mode of operation, and wherein the battery cooling system cools the electric vehicle's battery pack to a temperature within a third temperature range, a fourth temperature range or a fifth temperature range when in the second mode of operation; and user accessible means for selecting a preferred mode from a plurality of charging/operational modes, wherein a first mode utilizes the first cut-off voltage, the first temperature range, and the third temperature range, wherein a second mode utilizes the second cut-off voltage and the third temperature range, wherein a third mode utilizes the third cut-off voltage, the second temperature range and the fourth temperature range, and wherein a fourth mode utilizes the third cut-off voltage, the second temperature range and the fifth temperature range. The system can further include a battery heating system for preventing the battery pack temperature from falling below a preset temperature threshold when the battery charging system is coupled to the charging power source and when the fourth mode is selected by the selecting means. The system can further include a battery heating system for preventing the battery pack temperature from falling below a preset temperature threshold when the battery charging system is not coupled to the external charging power source and when the third mode is selected by the selecting means. The user accessible selecting means can utilize a touch-sensitive screen, a display system and a plurality of associated switching means, a plurality of switching means, a rotating switch, a voice recognition system, or a remote mode selector such as an RF remote or a remote utilizing any of a variety of network communication systems. The system can further include at least one mode indicator. The system can further include means for switching between the preferred mode and a default mode after a preset period of time or upon the occurrence of a preset condition. The system can further include user accessible means for selecting the default mode from the plurality of charging/operational modes. The system can further include means for prompting the user to select the preferred mode from the plurality of charging/operational modes.

In at least one embodiment of the invention, the electric vehicle includes a multi-mode charging and operating system comprised of a battery charging system that utilizes a cut-off voltage selected from at least three cut-off voltages, wherein the second cut-off voltage is higher than the first cut-off voltage and wherein the third cut-off voltage is higher than the second cut-off voltage; a battery cooling system for cooling the electric vehicle's battery pack when the battery charging system is not coupled to an external charging power source, the battery cooling system maintaining the battery pack temperature within at least a first temperature range or a second temperature range; a battery cooling system for cooling the electric vehicle's battery pack when the battery charging system is coupled to an external charging power source, the battery cooling system maintaining the battery pack temperature within at least a third temperature range, a fourth temperature range or a fifth temperature range; a charging/operational mode selector with at least four available charging/operational modes, wherein the first charging/operational mode defines a standard mode and utilizes the second cut-off voltage, the first temperature range and the third temperature range, wherein the second charging/operational mode defines a storage mode and utilizes the first cut-off voltage and the third temperature range, wherein the third charging/operational mode defines an extended driving range mode and utilizes the third cut-off voltage, the second temperature range and the fourth temperature range, and wherein the fourth charging/operational mode defines a performance mode and utilizes the third cut-off voltage, the second temperature range and the fifth temperature range; and a mode display that indicates which charging/operational mode has been selected.

In at least one embodiment of the invention, a method of setting a charging/operational mode of an electric vehicle is provided, the method comprising the steps of displaying a plurality of user accessible charging/operational modes, selecting a preferred mode from the plurality of user accessible charging/operational modes, displaying an indicator of the selected mode, adjusting a cut-off voltage and maintaining the temperature of the battery pack within a first preset range of temperatures when the electric vehicle is plugged into an external charging power source and within a second preset range of temperatures when the electric vehicle is not plugged into an external charging power source, wherein the cut-off voltage and the temperature range are based on the selected mode. The method can further comprise the step of reverting to a default charging/operational mode from the preferred charging/operational mode after a preset period of time, or after the electric vehicle has cycled from an operational mode to a standby mode a preset number of times.

A further understanding of the nature and advantages of the present invention may be realized by reference to the remaining portions of the specification and the drawings.

BRIEF DESCRIPTION OF THE DRAWINGS

FIG. 7 illustrates a simple charging/operational mode selector that does not require a display interface;

FIG. 8 illustrates a simple means of indicating the selected charging/operational mode; and FIG. 9 illustrates a system for remote charging/operational mode selection.

DESCRIPTION OF THE SPECIFIC EMBODIMENTS

In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all electric vehicle, also referred to as an EV, plug-in hybrid vehicles, also referred to as a PHEV, or a hybrid vehicle (HEV), a hybrid vehicle utilizing multiple propulsion sources one of which is an electric drive system.

Figure 1:
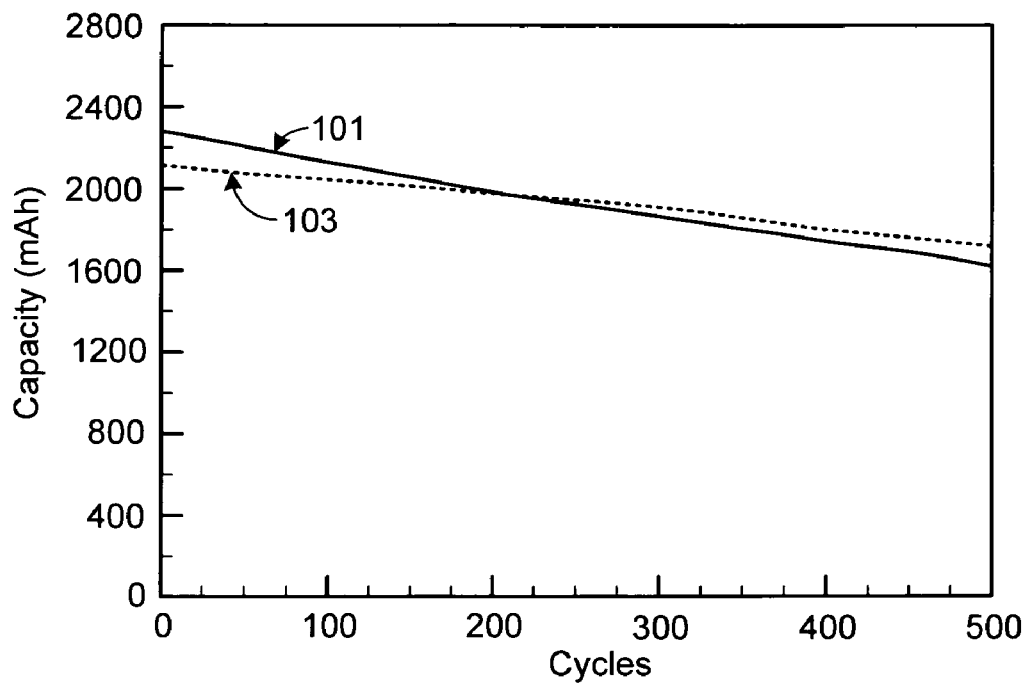
FIG. 1 graphically illustrates the effects of charging cut-off voltage on battery life.
Figure 2:
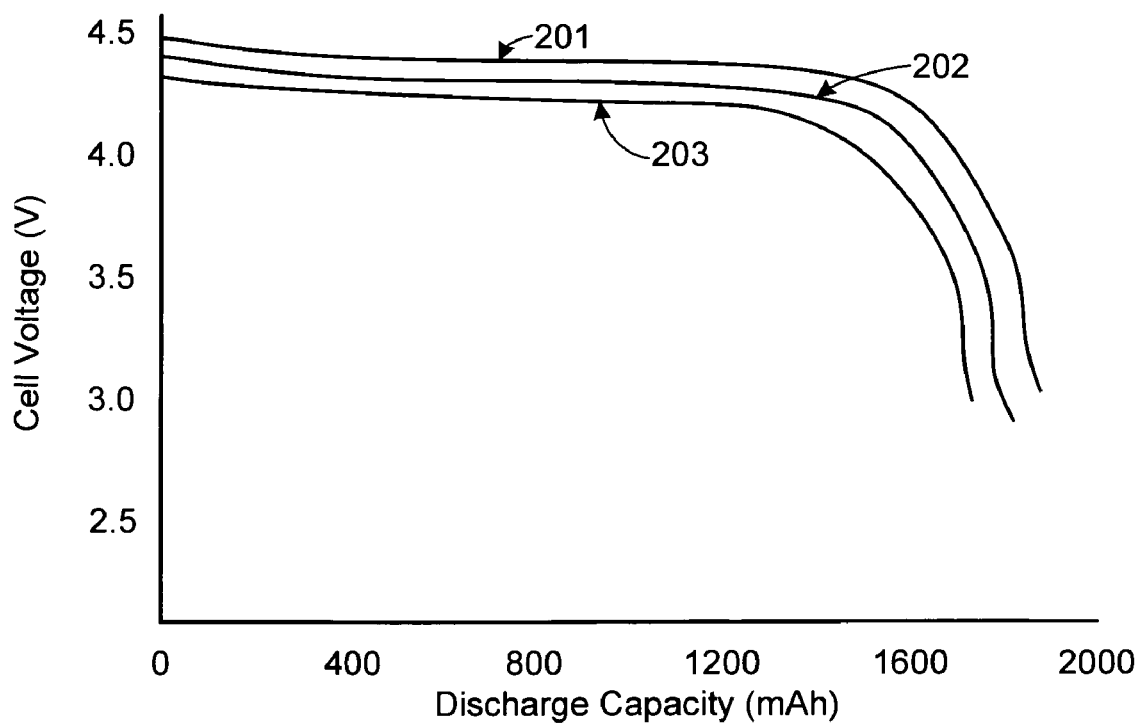
FIG. 2 graphically illustrates the effects of temperature on cell voltage and discharge capacity.
Figure 3:
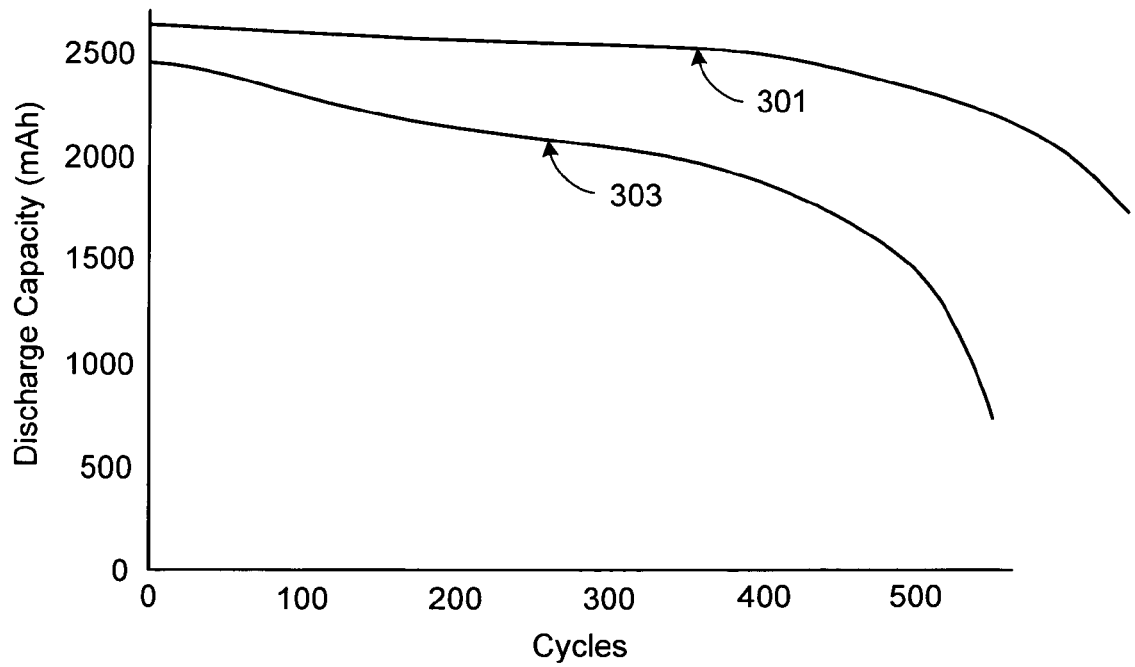
FIG. 3 graphically illustrates the effects of storage temperature on battery capacity.

FIGS. 1-3 illustrate several battery characteristics for an exemplary battery pack. It should be understood that different battery packs, for example those using a different cell chemistry, will exhibit different profiles than those shown in FIGS. 1-3, and that these figures are only meant to be illustrative, not limiting.

FIG. 1 is a graph that illustrates the effects of charging cut-off voltage on battery life, the cut-off voltage being the voltage at which charging is terminated. Utilizing a cut-off voltage of 4.15 volts (curve 101), initially the battery pack achieves a higher capacity than that obtained using a cut-off voltage of 4.10 volts (curve 103). However, after approximately 200 charging cycles, the capacity of the battery using the lower cut-off voltage is greater than that of the battery using the higher cut-off voltage, illustrating that the useful lifetime of a battery pack can be dramatically extended by simply lowering cut-off voltage. Unfortunately lowering the cut-off voltage has consequences to other aspects of the battery pack's performance, in particular capacity, since a battery charged to a higher voltage exhibits a greater capacity than the same battery charged to a lower voltage.

FIG. 2 is a graph illustrating the effects of temperature on the cell voltage and discharge capacity of an exemplary battery. In the figure, curve 201 corresponds to a temperature of 40° C., curve 202 corresponds to a temperature of 30° C., and curve 203 corresponds to a temperature of 20° C. As illustrated, an increase in operating temperature from 20° C. to 40° C. dramatically improves discharge capacity which, in turn, can lead to both improved vehicle performance (e.g., faster acceleration) and improved driving range for an electric vehicle using such a battery pack. A drawback, however, of operating at a higher temperature is the effect such a temperature has on battery life, specifically shortening the battery's life. Another adverse effect of higher temperatures is that a battery will typically exhibit higher non-recoverable capacity loss as the temperature is increased. This battery characteristic is illustrated in FIG. 3 in which curve 301 is for a battery pack cycled at 35° C. and curve 303 is for a battery pack cycled at 55° C. As shown, by decreasing the storage temperature of a battery, it is able to retain a much higher capacity over a longer cycle life.

There are many other battery characteristics that must be taken into account during the design of the drive system, battery pack and attendant charging system of an all-electric or hybrid vehicle. For example, the depth of discharge which the system allows, or that the system is designed to accommodate, will affect a battery's life. For most battery chemistries, frequently discharging the battery more than 70 to 80 percent of rated capacity will lead to decreases in battery life.

Figure 4:
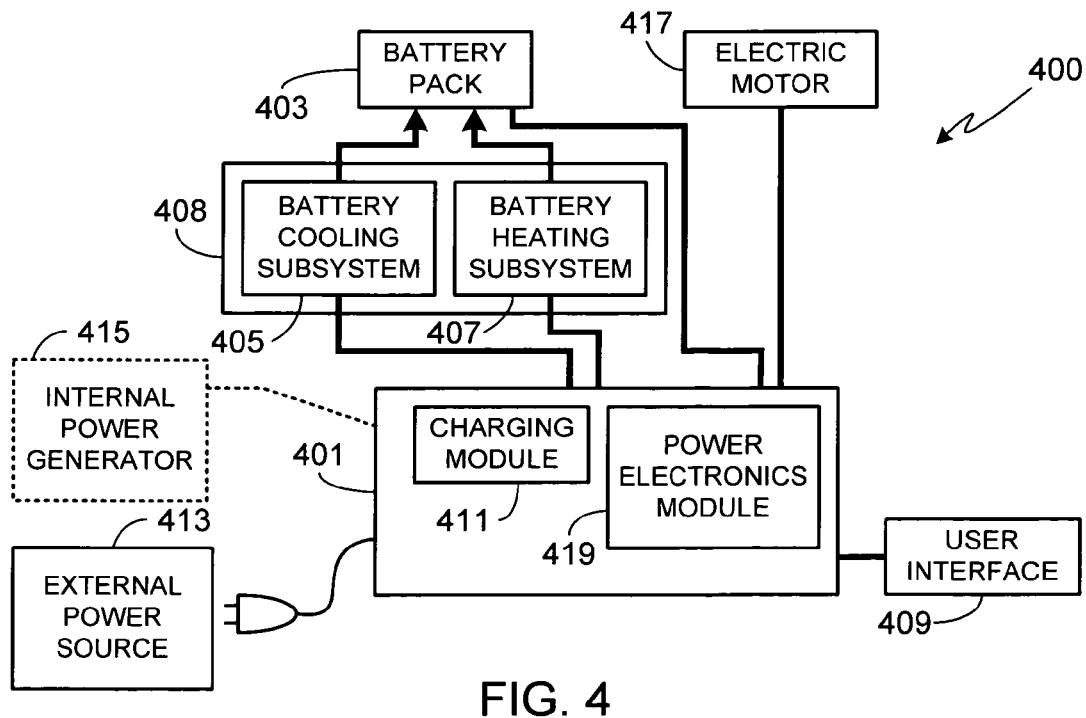
FIG. 4 is a high-level view of the primary vehicle subsystems impacted by a battery charging system designed in accordance with a preferred embodiment of the invention.

FIG. 4 is a high-level view of the primary vehicle subsystems impacted by a battery charging system designed in accordance with a preferred embodiment of the invention. It will be appreciated that a vehicle can utilize other subsystem configurations while still retaining the multi-charging mode capabilities of the present invention. As shown, system 400 includes a power control subsystem 401, a battery pack 403, a battery cooling subsystem 405, a battery heating subsystem 407, and a user interface 409. In a preferred embodiment, battery cooling system 405 and battery heating system 407 are combined into a temperature management system 408.

Power control subsystem 401 is comprised of a charging module 411 that controls and monitors cut-off voltage during charging. Charging module 411 may also control and monitor the charging rate. Preferably, and as described in further detail below, power control subsystem 401 also monitors the temperature of battery pack 403 and controls that temperature using battery cooling subsystem 405. In at least one embodiment, a battery heating subsystem 407 is also used by power control subsystem 401 to achieve the desired battery pack operating and/or storage temperature. An exemplary battery temperature control system is described in detail in co-pending U.S. patent application Ser. No. 11/786,108, filed Apr. 11, 2007, the disclosure of which is incorporated herein for any and all purposes.

Power control subsystem 401 also monitors the state of charge for battery pack 403, for example via charging module 411. Preferably subsystem 401 is also capable of monitoring the rate of discharge of battery pack 403, both during vehicle operation and vehicle storage. In addition, in at least one embodiment subsystem 401 monitors and stores in on-board memory the number of charging cycles to which the battery has been subjected. Preferably for each charging cycle the cut-off voltage and other charging parameters are monitored and stored in memory, thereby providing information that can be used to gauge the relative health of battery pack 403 and its expected lifetime.

Although charging module 411 is preferably integrated within power control subsystem 401 as shown, in at least one alternate embodiment charging module 411 is external to both the power control subsystem 401 and the vehicle. In such an embodiment, preferably the portion of the charging module that converts external power to a power level (e.g., voltage) that is compatible with battery pack 403 is external to the vehicle while a second portion of the charging module that controls charging characteristics such as cut-off voltage, charging rate, etc. is internal to the vehicle. Alternately, the entire charging module can be external to the power control subsystem 401 and the vehicle.

In at least one preferred embodiment, battery pack 403 is configured to be plugged into, or otherwise connected to, an external power source 413 via charging module 411. A municipal power grid is one example of an external power source 413. Charging module 411 insures that the power from source 413 is converted to a form of power storable by battery pack 403. For example, charging module 411 typically includes an AC to DC rectifier in order to convert power from the power source to that required by battery pack 403. In at least one embodiment, battery pack 403 is charged in whole or in part by a power generator 415 that is contained within the vehicle, i.e., an on-board power generator, which is coupled to the battery pack via charging module 411. As on-board power generator 415 is not necessary to the implementation of the invention, it is shown in phantom. It will be appreciated that in some embodiments, while external power source 413 is preferred for providing a full charge to battery pack 403, internal power source 415 can be used to augment the charge within the battery pack, for example by charging battery pack 403 during vehicle use, thereby extending driving range. In at least one embodiment, internal power source 415 is a regenerative braking system.

Power control subsystem 401 also controls the power coupled from battery pack 403 to vehicle propulsion motor 417, for example using a power electronics module (PEM) 419. Power electronics module 419 is used to insure that the power delivered to motor 417 has the desired voltage, current, waveform, etc. Thus, for example, power electronics module 419 preferably includes a DC to AC inverter, as well as the necessary control circuitry/processor to implement the various selectable charge modes as described in detail below. It will be appreciated that vehicle propulsion motor 417 can be comprised of a single electric motor, or multiple electric motors.

User interface 409 is preferably integrated into the vehicle's user interface, although interface 409 can be implemented in other ways as described in detail below. Interface 409 provides a means for the user to control the selection of the charging mode as well as associated parameters. Preferably interface 409 also provides means for identifying which mode the vehicle is in at any given time, as described further below.

Charging/Operational Modes

The system of the present invention allows the user to select the operational mode of a vehicle, more specifically aspects of the charging, battery and power control systems that affect the performance of an electric vehicle (i.e., all electric or hybrid) and the battery pack, as well as the life expectancy of the battery pack. Preferred modes of operation will now be described in detail.

Standard Mode—In the Standard Mode, the system is configured to provide the optimal compromise between performance, driving range and battery life. In general, the Standard Mode will limit the cut-off voltage during charging to approximately 70%-95% of the rated capacity. In a preferred embodiment, the cut-off voltage in the Standard Mode is set to approximately 4.10 volts. The Standard Mode is intended to maintain the battery pack at a relatively cool temperature during both vehicle operation (i.e., driving) and when plugged in, preferably cooling the battery pack to a temperature within the range of approximately 30° C. to 35° C. during vehicle operation, and within the range of approximately 20° C. to 25° C. when the vehicle is plugged in to the external power source.

Storage Mode—The Storage Mode is configured to optimize battery life when the vehicle is stored for an extended period of time, for example, for a period of time greater than 2 or 3 weeks. In this mode, the cut-off voltage during charging is limited to approximately 30%-70%, and more preferably to approximately 30%-50%. In a preferred embodiment, the cut-off voltage in the Storage Mode is set to approximately 3.80 volts. As in the Standard Mode, the battery pack temperature is maintained at a relatively cool temperature, preferably in the range of approximately 20° C. to 25° C., when the charging system is coupled to an external power source. In at least one embodiment, once Storage Mode is selected, and assuming that the vehicle is plugged in rather than operating and that the battery pack's state of charge is greater than a preset value (e.g., 50%), the system actively lowers the charge state to the preset value, thereby helping to prolong battery life. Preferably the system actively lowers the charge state by subjecting the battery pack to a load (e.g., turning on a light(s), fan, dummy load, etc.).

Extended Driving Range Mode—This mode, also referred to as the Max Range Mode, optimizes the system for maximum driving range, i.e., distance. During vehicle operation, the battery is kept relatively warm, thereby decreasing battery impedance and achieving greater discharge capacity. In a preferred embodiment, during vehicle operation in this mode, the temperature is not cooled until the temperature rises to about 40° C. The cooling system then operates to keep it within the range of approximately 37° C. to 40° C. If the Max Range Mode is selected and the vehicle is plugged into an external power source, the battery pack is cooled to a lower temperature than normal, preferably in the range of approximately 15° C. to 17° C. During charging the maximum cut-off voltage is used, i.e., approximately 90%-100% of rated capacity. In the preferred embodiment, the cut-off voltage is set to approximately 4.15-4.18 volts.

Performance Mode—This mode is intended to achieve the best vehicle performance available, at the cost of both battery life and range. In general, the Performance Mode uses the maximum cut-off voltage during charging, i.e., approximately 90%-100%. In one embodiment, the maximum cut-off voltage is set to approximately 4.15 to 4.18 volts. In a preferred embodiment, during vehicle operation the battery pack temperature is allowed to rise to a temperature within the range of approximately 37° C. to 40° C. and then cooled to maintain the temperature within this range. In this mode when the vehicle is plugged into the external power source, preferably the battery temperature is cooled (if necessary) to a temperature within the range of approximately 35° C. to 40° C.

In at least one alternate embodiment, in addition to the above-described battery pack cooling conditions, when the vehicle is plugged in pre-heating is used, as necessary, to insure that the battery pack temperature does not fall below a preset temperature, for example 33° C. In particular, in this alternate embodiment the battery pre-heater is enabled when the battery temperature falls below 33° C., and is then disabled once a temperature of 35° C. is reached.

In addition to charging the battery pack to the maximum level and maintaining the battery at a relatively high temperature, in at least one embodiment when the user selects the Performance Mode, the power control subsystem via the power electronics module provides an additional performance boost. Specifically, in this embodiment when the Performance Mode is selected, the system provides a temporary increase in the available current that can be supplied to motor 417. In an exemplary system, the available current is increased from 850 amps rms to 900 amps rms. As the increase in current stresses many vehicle components (e.g., PEM 419, motor shaft, transmission, etc.), preferably the current boost is of very limited duration. For example in one embodiment, the current boost is only allowed for a maximum duration of 5 seconds. Preferably other limitations are placed on the current boost, for example limiting it to one use per Performance Mode selection. In order to limit system stress, the current boost can also be limited to a predetermined number of times per time period, the time period being measured in days, weeks or months.

It will be appreciated that the cut-off voltages as well as the optimal temperature ranges provided above relative to the described charging/operational modes of operation are based on a specific vehicle and battery pack. The inventors envision that other vehicles and/or battery types may require different operational parameters (e.g., cut-off voltages, battery temperatures, etc.) in order to achieve the desired goals of optimizing the charging, battery and power control systems for such specific charging/operational modes as Standard Mode, Storage Mode, Extended Driving Range Mode and Performance Mode.

In a preferred embodiment of the invention, if the vehicle is plugged into external power source 413 during any of the above modes and battery pack charging has been completed, in addition to initiating battery pack cooling in order to keep the battery within the preset temperature range, charging is re-initiated so that the battery is not used to power cooling subsystem 405. Charging re-initiation can start before, after, or at the same time as cooling subsystem initiation.

In at least one embodiment, the selection of a specific charging/operational mode also impacts the charging profile employed while operating the vehicle. This embodiment requires some form of an internal power generator 415. Preferably internal power generator 415 utilizes a regenerative braking system, either alone or in combination with other power generation means (e.g., roof-mounted solar panels, etc.). In this embodiment, the state of charge of battery pack 403 is monitored and maintained within a predefined range using the charging capabilities provided by the internal power generator. Preferably, in the Standard Mode an average charge of approximately 50% is maintained; in the Storage Mode an average charge of 30-50% is maintained; and in the Max Range and the Performance Modes an average charge of approximately 70% is maintained.

In at least one embodiment, when the vehicle is plugged into external power source 413, the power control subsystem 401 determines the voltage and current of the source. If the voltage is less than a preset value, e.g., 150 volts, or if the line current is less than or equal to a preset value, e.g., 12 amps, battery cooling is limited. This approach can be used, for example, to shorten charge time. In a specific application, when subsystem 401 determines that the voltage/current of the external power source is less than the preset value, the battery temperature is cooled to a temperature within the range of approximately 37° C. to 40° C. regardless of the charging/operational mode selected, and once the battery pack temperature is less than 37° C., the cooling subsystem is disabled.

Alternate Charging/Operational Modes

In an alternate embodiment of the invention, the system of the present invention allows the user to select a mode based on one or more battery/power system characteristics. For example, in one such embodiment, means (e.g., dial, menu based system on a visual display, buttons, etc.) are provided that allow the user to select the charging cut-off voltage. Preferably the user is given four or more options such as 3.8 volts, 3.9 volts, 4.0 volts, 4.1 volts and 4.15 volts. Alternately, the provided means allow the user to select the average charge, e.g., 30%, 40%, 50%, 60%, 70%, 80%, 90% and 100%.

In this alternate embodiment, means are preferably used to indicate to the user both the advantages and the disadvantages for each selection. For example, a display monitor can graphically illustrate that as the cut-off voltage is increased, the user is gaining performance and driving range while negatively impacting battery life. In one relatively simple display, the user is shown a sliding scale (e.g., from minimum driving range to maximum driving range) with an indicator on the scale showing the user's selection. In an example of a relatively complex display, the system calculates the effects of the user's selection on predicted battery life or on the vehicle's driving range.

In this alternate embodiment, preferably the power control subsystem 401 sets additional system parameters based on the user's selection. For example, as the selected cut-off voltage is increased, the system can automatically increase battery temperature as well as the cut-off voltage, assuming that if the user selects a higher cut-off voltage, they are less interested in battery life and more interested in performance. In at least one such embodiment, the power control subsystem uses a look-up table to determine appropriate battery temperatures, charging characteristics, etc., all based on the user's selection.

Mode Selection Means

Figure 5:
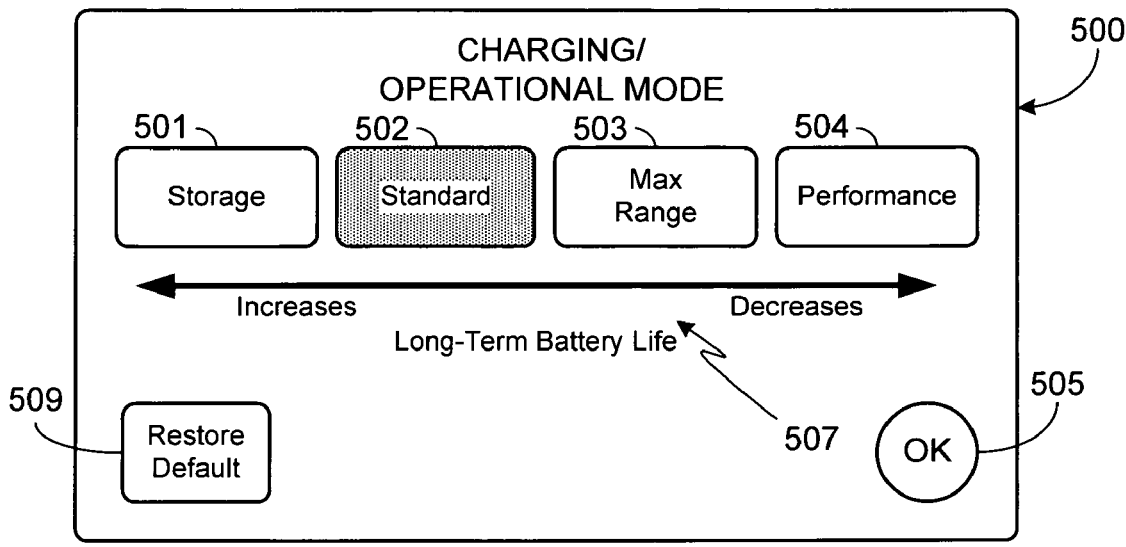
FIG. 5 illustrates a touch-sensitive display screen associated with one embodiment of a charging/operational mode selector.

The present invention can utilize any of a variety of charging/operational mode selection means. In a preferred embodiment, a display system is used, either alone with a touch-sensitive screen, or together with a plurality of switching means (e.g., toggle switches, push button switches, slide switches, etc.). For example, FIG. 5 illustrates the display screen 500 of a touch-sensitive display system. Display screen 500 can be a stand-alone display screen or, as preferred, simply one display screen of a plurality of display screens comprising a user interface. Preferably this user interface allows the user to perform other functions associated with the operation of the vehicle, such as monitoring performance, monitoring battery life, monitoring the state of charge of the battery, monitoring the remaining miles to drive on the current battery charge, adjusting system default settings, and other monitoring/operational functions. This same user interface, through additional screens, can also be used to provide the user with AC/heat controls, audio entertainment controls, cell phone controls, navigation system controls, and other convenience functions.

Display screen 500 includes a plurality of touch-sensitive buttons 501-504 that correspond to the available charging/operational modes. In one embodiment, touching one of the buttons 501-504 causes the corresponding mode to be selected. Preferably the touched button is highlighted to indicate the selection. In FIG. 5, button 502 is shown as highlighted. In an alternate embodiment, a mode selection button must be touched followed by pushing (i.e., touching) a data entry button 505. Requiring the selection of two buttons, i.e., the mode button and the entry button, decreases the risk of an inadvertent mode change. In an alternate embodiment that is intended to further reduce the risk of inadvertent or unauthorized mode changes, after selecting a mode, or after selecting a mode and touching the data entry button, a secondary mode selection screen is displayed that requests a user personal identification number (PIN) or password.

Preferably the charging/operational mode selection means includes some indicator that helps the user to recognize the effects of their mode selection. In FIG. 5 indicator 507 graphically illustrates the effects of the different modes on battery life. It will be appreciated that there are numerous ways in which such an indication can be made and that are clearly envisioned by the inventors. For example, each button can be color-coded. Alternately, a secondary display screen can be displayed when the user makes a selection, the secondary display screen highlighting the effects of the selection. For example, when the user selects the Max Range Mode, the display screen may provide an indication of the improved range (e.g., "range increased by 10%") and the effects on battery life (e.g., "decreases long-term battery life").

Figure 6:
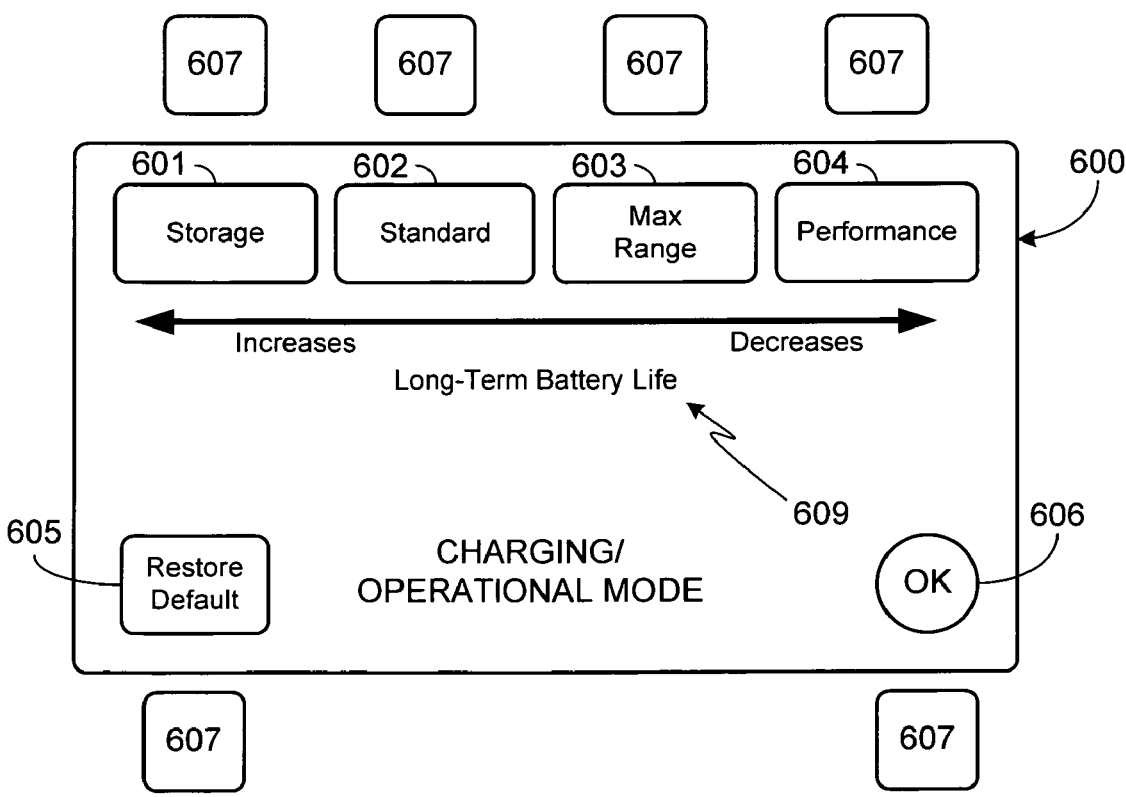
FIG. 6 illustrates a non-touch-sensitive display used in conjunction with other switching means in an alternate embodiment of a charging/operational mode selector.

As previously noted, there are numerous other ways of configuring the charging/operational mode selection means. For example, if a non-touch-sensitive display is used, preferably the screen is immediately adjacent to a plurality of buttons, toggle switches, or other switching means that are used in conjunction with the display to provide the selection means. FIG. 6 illustrates one such means. As shown, screen 600 is configured so that the possible modes 601-604 as well as other possible inputs 605-606 are immediately adjacent to hard buttons, or other switching means, 607. It will be appreciated that buttons/switches 607 can similarly be used to provide other data input simply by re-configuring the display and associating the hard switches 607 with other functions. As in the previous example, display screen 600 includes an indicator 609 that shows the user the effects of their selection.

In addition to a charging/operational mode selector that uses a display screen, e.g., displays 500 and 600, as previously noted a simple non-display mode selector can also be used with the invention. For example, such a mode selector can be comprised solely of push buttons, toggle switches, slide switches, rotating switches, etc., which can be located within the passenger compartment (e.g., on the dash, on the console, etc.) or elsewhere (e.g., near the plug-in receptacle on the outside of the vehicle, preferably covered by a charging receptacle cover door). FIG. 7 illustrates one such charging/operational mode selector that does not require a display interface, rather it uses a rotating switch 701. Indicators 703 surround switch 701, each of which indicates a particular charging/operational mode. In the illustration shown in FIG. 7, four charging/operational modes are shown with the Max Range Mode selected. As in the prior embodiments, preferably an indicator is used, e.g., indicator 705, to insure that the user recognizes the effects of their selection on a system parameter (e.g., battery life).

In another embodiment, the charging/operational mode selection means uses a voice recognition system such as those commonly used with on-board vehicle navigation systems. Preferably the voice recognition system uses a display interface as well, thus simplifying system/user interaction and providing the user with positive indicators when their voice inputs have been correctly accepted by the system.

Regardless of the selection means used, preferably the system includes one or more indicators that indicate the selected mode. Preferably the indicators are easily visible to insure that the user recognizes the selected mode. For example, four indicators can be located on the dashboard, easily visible to the driver, representing the four charging/operational modes illustrated in FIGS. 5-7. Preferably next to each indicator is either a textual indicator of the mode, as shown in FIG. 8, or a symbolic indicator of the mode. In at least one embodiment, the indicators are also color coded, thus providing a secondary indicator of selected mode. For example, in the indicators shown in FIG. 8, indicator 801 is blue, indicator 803 is green, indicator 805 is yellow and indicator 807 is red. This is but one of numerous ways in which the selected mode can be highlighted to the driver of the vehicle.

In addition to, or instead of, an on-board charging/operational mode selection means, a remote selection means can be employed. The primary advantage of this type of mode selector is that it allows the user to remotely alter the charging/operational mode. For example, while on a trip the user may find that their trip has been extended and that their vehicle will not be used for an extended period of time. Certain types of remote mode selectors would allow the user to change the mode to the Storage Mode, thereby improving battery life.

FIG. 9 is a simplified illustration of a system for remote charging/operational mode selection. As shown, the system includes a remote mode selector 901 and an on-board communication system 903 that communicates with remote mode selector 901 via communication network 905. On-board communication system 903 is coupled to on-board mode selection means 907, both of which are contained within vehicle 909. In the simplest form, remote mode selector 901 is an RF remote, therefore not requiring a communication network. Due to the limited range of an RF remote, in a preferred embodiment remote 901 communicates via network 905, network 905 being any of a variety of known network systems such as cellular, internet, satellite or other. For example, in one embodiment the remote mode selector 901 is a computer or a web-browser on a cell phone and network 905 is an internet-based network system. Further descriptions of suitable vehicle communication systems are given in co-pending U.S. patent application Ser. No. 11/818,838, filed Jun. 15, 2007 and Ser. No. 11/779,678, filed Jul. 18, 2007, the disclosures of which are incorporated herein for any and all purposes.

In at least one embodiment of the invention, the system prompts the user to select a charging/operational mode. Preferably the user is prompted after turning off the car, but prior to exiting the car, for example when the user first turns the key (or other vehicle on/off control switch) from the operational/driving position to the standby/off position. The user can be prompted by a tone or series of tones, by a pre-recorded or synthesized voice, or by a display means (e.g., flashing indicator, flashing screen on the display interface, etc.), or a combination thereof.

Default System

In one preferred embodiment, the default mode for the charging/operational mode selection system is the Standard Mode. In this embodiment, the system resets to the default mode, i.e., Standard Mode, after each user selected charging/operational mode is complete. Thus, for example, if the user selects the Storage Mode, the system will remain in the Storage Mode as long as the vehicle remains in storage. Once the vehicle is taken out of storage, for example by operating the vehicle, the system automatically returns to the default mode. Similarly, if the user sets the system to the Performance Mode or the Max Range Mode, the vehicle stays in the selected mode during vehicle operation, but returns to the default mode the first time the user turns off the car or the next time the vehicle is plugged into an external power source for charging.

In at least one embodiment of the invention, the user is able to select the default mode for the charging/operational mode selection system. The user is also able to select the temporary charging/operational mode using the mode selection means as previously described. Preferably the mode changes from the preferred mode to the default mode after a preset period of time, or after the occurrence of a particular event such as the completion of the present driving cycle and the vehicle being changed from the operational mode to the charging mode, or after the occurrence of a particular event such as the vehicle being changed from the charging mode to the operational mode.

In at least one embodiment of the invention, if the vehicle is not operated for a preset period of time, the vehicle automatically switches mode from the default mode (e.g., Standard Mode) to the Storage Mode. The vehicle preferably stays in the Storage Mode until the user either operates the vehicle or actively selects a different charging/operational mode. Preferably in this embodiment the user is able to set the preset time period, for example by choosing from a list of time periods (e.g., 1 week, 2 weeks, 3 weeks, etc.). This option allows the user to set-up the vehicle based on the user's particular driving habits, thus insuring that the vehicle is not unintentionally placed in the Storage Mode.

In at least one embodiment of the invention, the user is able to switch modes from the current mode to the Performance Mode while driving the vehicle. Preferably the switching means used to switch from the current mode into the Performance Mode is different from, and in addition to, the normal user mode selection means. For example, in one embodiment if the user completely depresses the accelerator pad more than once within a preset time period, for example in a 3 second time period, than the charging/operational mode switches to the Performance Mode. In an alternate embodiment, if the user completely depresses the accelerator pad more than twice within the preset time period than the charging/operational mode switches to the Performance Mode. Preferably the preset time period is preset by the vehicle's manufacturer. Alternately, the preset time period is preset, or configurable, by a representative of the manufacturer such as an authorized service provider. Alternately, the preset time period is configurable by the user. Preferably if an embodiment of the invention is used which allows the user to switch from the current mode into the Performance Mode while driving, the embodiment is also configured to automatically revert to the Standard Mode, either after a predetermined time period (e.g., 24 hours) or upon completion of the present driving period (i.e., when power is turned off and the vehicle enters the standby mode) or upon completion of the present driving cycle (i.e., when power is turned off and the vehicle is plugged in to recharge battery pack 403).

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An electric vehicle multi-mode battery charging and operating system, comprising:

a battery charging system for charging a battery pack of an electric vehicle, said battery charging system utilizing a cut-off voltage selected from at least a first cut-off voltage, a second cut-off voltage, and a third cut-off voltage;

a battery cooling system for cooling said battery pack of said electric vehicle, wherein said battery cooling system has at least two modes of operation, wherein said battery cooling system in a first mode of said at least two modes of operation maintains said battery pack within a first preset temperature range when said battery charging system is not coupled to an external charging power source, wherein said battery cooling system in a second mode of said at least two modes of operation maintains said battery pack within a second preset temperature range when said battery charging system is coupled to an external charging power source, wherein said first preset temperature range is selected from at least a first temperature range and a second temperature range, and wherein said second preset temperature range is selected from at least a third temperature range, a fourth temperature range and a fifth temperature range; and means for selecting a preferred mode from a plurality of charging/operational modes, wherein said selecting means is accessible by a user of said electric vehicle, wherein a first mode of said plurality of charging/operational modes utilizes said first cut-off voltage, said first temperature range and said third temperature range, wherein a second mode of said plurality of charging/operational modes utilizes said second cut-off voltage and said third temperature range, and wherein a third mode of said plurality of charging/operational modes utilizes said third cut-off voltage, said second temperature range and said fourth temperature range, and wherein a fourth mode of said plurality of charging/operational modes utilizes said third cut-off voltage, said second temperature range and said fifth temperature range.

2. The electric vehicle multi-mode battery charging and operating system of claim 1, wherein said first cut-off voltage is approximately 4.10 volts, said second cut-off voltage is approximately 3.80 volts, said third cut-off voltage is at least 4.15 volts, said first temperature range is approximately 30° C. to 35° C., said second temperature range is approximately 37° C. to 40° C., said third temperature range is approximately 20° C. to 25° C., said fourth temperature range is approximately 15° C. to 17° C., and said fifth temperature range is approximately 35° C. to 40° C.

3. The electric vehicle multi-mode battery charging and operating system of claim 1, further comprising a battery heating system for preventing a battery pack temperature from falling below a preset temperature threshold when said battery charging system is coupled to said charging power source and when said fourth mode is selected by said selecting means.

4. The electric vehicle multi-mode battery charging and operating system of claim 3, wherein said preset temperature is approximately 33° C.

5. The electric vehicle multi-mode battery charging and operating system of claim 1, further comprising a battery heating system for preventing a battery pack temperature from falling below a preset temperature threshold when said battery charging system is not coupled to said external charging power source and when said third mode is selected by said selecting means.

6. The electric vehicle multi-mode battery charging and operating system of claim 5, wherein said preset temperature is approximately 35° C.

7. The electric vehicle multi-mode battery charging and operating system of claim 1, wherein said selecting means is comprised of a touch-sensitive screen.

8. The electric vehicle multi-mode battery charging and operating system of claim 7, wherein said touch-sensitive screen is associated with a vehicle user interface system.

9. The electric vehicle multi-mode battery charging and operating system of claim 1, wherein said selecting means is comprised of a display system and a plurality of switching means.

10. The electric vehicle multi-mode battery charging and operating system of claim 9, wherein said switching means are selected from the group consisting of push-buttons, toggle switches, rotating switches and slide switches.

11. The electric vehicle multi-mode battery charging and operating system of claim 1, wherein said selecting means is comprised of a plurality of switching means.

12. The electric vehicle multi-mode battery charging and operating system of claim 11, wherein said switching means are selected from the group consisting of push-buttons, toggle switches, rotating switches and slide switches.

13. The electric vehicle multi-mode battery charging and operating system of claim 1, wherein said selecting means is a rotating switch.

14. The electric vehicle multi-mode battery charging and operating system of claim 1, wherein said selecting means is a voice recognition system.

15. The electric vehicle multi-mode battery charging and operating system of claim 1, further comprising a communication interface in communication with a network, wherein said selecting means is a remote mode selector in communication with said network, wherein said remote mode selector is separate from said electric vehicle.

16. The electric vehicle multi-mode battery charging and operating system of claim 1, further comprising an RF communication interface, wherein said selecting means is an RF remote mode selector separate from said electric vehicle.

17. The electric vehicle multi-mode battery charging and operating system of claim 1, further comprising at least one mode indicator, wherein said at least one mode indicator indicates which mode of said plurality of charging/operational modes is selected by said selecting means.

18. The electric vehicle multi-mode battery charging and operating system of claim 1, wherein said first mode of said plurality of charging/operational modes is a default mode, said electric vehicle multi-mode battery charging and operating system further comprising means for switching from said preferred mode to said default mode upon the occurrence of a preset condition.

19. The electric vehicle multi-mode battery charging and operating system of claim 18, wherein said preset condition is changing from an operational vehicle mode to a charging mode.

20. The electric vehicle multi-mode battery charging and operating system of claim 18, wherein said preset condition is changing from a charging mode to an operational vehicle mode.

21. The electric vehicle multi-mode battery charging and operating system of claim 18, wherein said preset condition is a preset period of time.

22. The electric vehicle multi-mode battery charging and operating system of claim 1, further comprising means for selecting a default mode from said plurality of charging/operational modes, wherein said default mode selecting means is accessible by a user of said electric vehicle, and wherein said electric vehicle multi-mode battery charging and operating system further comprises means for switching from said preferred mode to said default mode upon the occurrence of a preset condition.

23. The electric vehicle multi-mode battery charging and operating system of claim 1, further comprising means for prompting said user to select said preferred mode from said plurality of charging/operational modes using said selecting means.

24. A method of setting a charging/operational mode of an electric vehicle, the method comprising the steps of:
displaying a plurality of user accessible charging/operational modes;
selecting a preferred mode from said plurality of user accessible charging/operational modes;
displaying an indicator of said selected preferred mode;
adjusting a charging cut-off voltage to a first cut-off voltage in response to selecting a first mode as said preferred mode;
cooling a battery pack of said electric vehicle to a battery pack temperature within a first range of temperatures in response to selecting said first mode as said preferred mode, wherein said step of cooling said battery pack to said battery pack temperature within said first range of temperatures is performed while said electric vehicle is operating and when said electric vehicle is not coupled to an external charging power source;

cooling said battery pack of said electric vehicle to said battery pack temperature within a second range of temperatures in response to selecting said first mode as said preferred mode, wherein said step of cooling said battery pack to said battery pack temperature within said second range of temperatures is performed after said electric vehicle is coupled to said external charging power source;

adjusting said charging cut-off voltage to a second cut-off voltage in response to selecting a second mode as said preferred mode;

cooling said battery pack of said electric vehicle to said battery pack temperature within said second range of temperatures in response to selecting said second mode as said preferred mode, wherein said step of cooling said battery pack to said battery pack temperature within said second range of temperatures is performed after said electric vehicle is coupled to said external charging power source;

adjusting said charging cut-off voltage to a third cut-off voltage in response to selecting a third mode as said preferred mode;

cooling said battery pack of said electric vehicle to said battery pack temperature within a third range of temperatures in response to selecting said third mode as said preferred mode, wherein said step of cooling said battery pack to said battery pack temperature within said third range of temperatures is performed while said electric vehicle is operating and when said electric vehicle is not coupled to said external charging power source;

cooling said battery pack of said electric vehicle to said battery pack temperature within a fourth range of temperatures in response to selecting said third mode as said preferred mode, wherein said step of cooling said battery pack to said battery pack temperature within said fourth range of temperatures is performed after said electric vehicle is coupled to said external charging power source;

adjusting said charging cut-off voltage to said third cut-off voltage in response to selecting a fourth mode as said preferred mode;

cooling said battery pack of said electric vehicle to said battery pack temperature within a third range of temperatures in response to selecting said fourth mode as said preferred mode, wherein said step of cooling said battery pack to said battery pack temperature within said third range of temperatures is performed while said electric vehicle is operating and when said electric vehicle is not coupled to said external charging power source; and cooling said battery pack of said electric vehicle to said battery pack temperature within a fourth range of temperatures in response to selecting said fourth mode as said preferred mode, wherein said step of cooling said battery pack to said battery pack temperature within said fifth range of temperatures is performed after said electric vehicle is coupled to said external charging power source.

25. The method of claim 24, further comprising the step of reverting to a default mode from said preferred mode after a preset period of time, wherein said default mode is one of said plurality of user accessible charging/operational modes.

26. The method of claim 24, further comprising the step of reverting to a default mode from said preferred mode after said electric vehicle cycles from an operational mode to a charging mode, wherein said default mode is one of said plurality of user accessible charging/operational modes.

27. The method of claim 24, further comprising the step of preventing said battery pack temperature from falling below a preset temperature threshold when said battery charging system is coupled to said charging power source and when said fourth mode is selected as said preferred mode.

28. The method of claim 24, further comprising the step of heating said battery pack of said electric vehicle to said battery pack temperature above a preset temperature threshold when said battery charging system is coupled to said charging power source and when said fourth mode is selected as said preferred mode.

29. An electric vehicle multi-mode battery charging and operating system, comprising:

a battery charging system for charging a battery pack of an electric vehicle, said battery charging system utilizing a cut-off voltage selected from at least a first cut-off voltage, a second cut-off voltage, and a third cut-off voltage, wherein said second cut-off voltage is higher than said first cut-off voltage, and wherein said third cut-off voltage is higher than said second cut-off voltage;

a battery cooling system for cooling said battery pack of said electric vehicle, wherein said battery cooling system has at least two modes of operation, wherein said battery cooling system in a first mode of said at least two modes of operation maintains said battery pack within a first preset temperature range when said battery charging system is not coupled to an external charging power source, wherein said battery cooling system in a second mode of said at least two modes of operation maintains said battery pack within a second preset temperature range when said battery charging system is coupled to an external charging power source, wherein said first preset temperature range is selected from at least a first temperature range and a second temperature range, and wherein said second preset temperature range is selected from at least a third temperature range, a fourth temperature range and a fifth temperature range; and a charging/operational mode selector with at least four available charging/operational modes, wherein said charging/operational mode selector is accessible by a user of said electric vehicle, wherein a first charging/operational mode defines a standard mode and utilizes said second cut-off voltage, said first temperature range and said third temperature range, wherein a second charging/operational mode defines a storage mode and utilizes said first cut-off voltage and said third temperature range, wherein a third charging/operational mode defines an extended driving range mode and utilizes said third cut-off voltage, said second temperature range and said fourth temperature range, and wherein a fourth charging/operational mode defines a performance mode and utilizes said third cut-off voltage, said second temperature range and said fifth temperature range; and a mode display, wherein said mode display indicates which charging/operational mode of said at least four available charging/operational modes has been selected.

* * * * *